United States Patent [19]

Olsson et al.

[11] 4,149,762
[45] Apr. 17, 1979

[54] SELF-LEVELING DISPENSER

[75] Inventors: Frank C. Olsson, East Lyme; Francis A. Uliano, Middletown, both of Conn.

[73] Assignee: AMF Incorporated, White Plains, N.Y.

[21] Appl. No.: 828,386

[22] Filed: Aug. 29, 1977

[51] Int. Cl.² ............................ A47B 9/02; A47F 1/00
[52] U.S. Cl. .................................... 312/71; 108/136; 248/588
[58] Field of Search .................. 312/71, 306, 312; 220/93; 221/279; 108/136; 248/399

[56] References Cited

U.S. PATENT DOCUMENTS

| | | | |
|---|---|---|---|
| 1,734,776 | 11/1929 | Pallenberg | 248/399 |
| 2,798,641 | 7/1957 | Coddington | 220/93 |
| 2,980,287 | 4/1961 | Fisher | 312/71 |
| 3,418,031 | 12/1968 | Fisher | 312/71 |
| 3,432,039 | 3/1969 | Howitt | 108/136 |
| 3,663,078 | 5/1972 | Moore et al. | 312/71 |

*Primary Examiner*—Mervin Stein
*Assistant Examiner*—Alex Grosz
*Attorney, Agent, or Firm*—George W. Price; Walter Lewis

[57] ABSTRACT

A pair of movable joined scissors are positioned between the base and dispenser table by being roller-guide connected thereto, and the main compression springs are tied to the scissors axis, and the scissors are centered by tension springs connected to the scissors and base.

4 Claims, 6 Drawing Figures

SELF-LEVELING DISPENSER

This invention relates to a dispenser, and more particularly, to an improved self-leveling dispenser.

The invention is illustrated in connection with a relatively large industrial type dispenser that has a travel of about 28" and can handle loads of up to about one ton. In this, and other types of dispensers, a combination of lever arms and/or scissors, springs, and guides have heretofore been used to equalize forces and keep the dispenser table or platform level. However, as far as we know, none of these prior art mechanisms have been self-adjusting in the sense of being self-centering and additionally operable to prevent buckling of the main compression springs.

It is an object of this invention to provide an improved, low cost, readily assembled, and minimum parts, self-leveling dispenser which will overcome the shortcomings of the prior art.

Briefly, in the invention tandem scissors are roller guided to the dispenser base and table so as to be free to move or "float" in an end-to-end direction. However, the ends of the scissors have tension springs connected thereto to cause the tandem scissors to always be centered. The main compression springs are tied to the scissors axis to also be centered. However, should they buckle, and thus move the scissors axis, the tension springs will return the scissors axis to center position which, of course, straightens the main compression springs.

Figure 1:
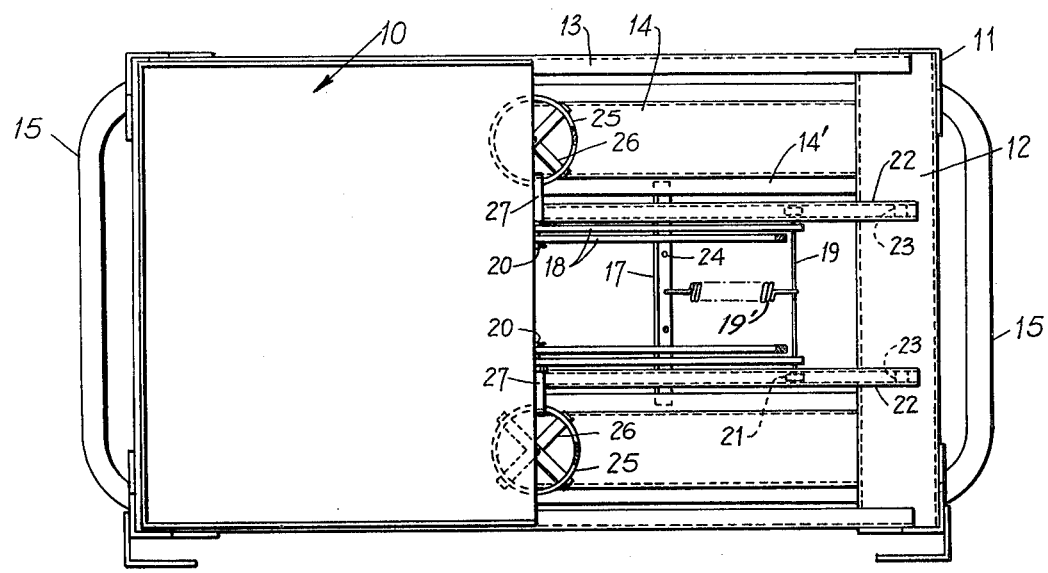
Figure 2:
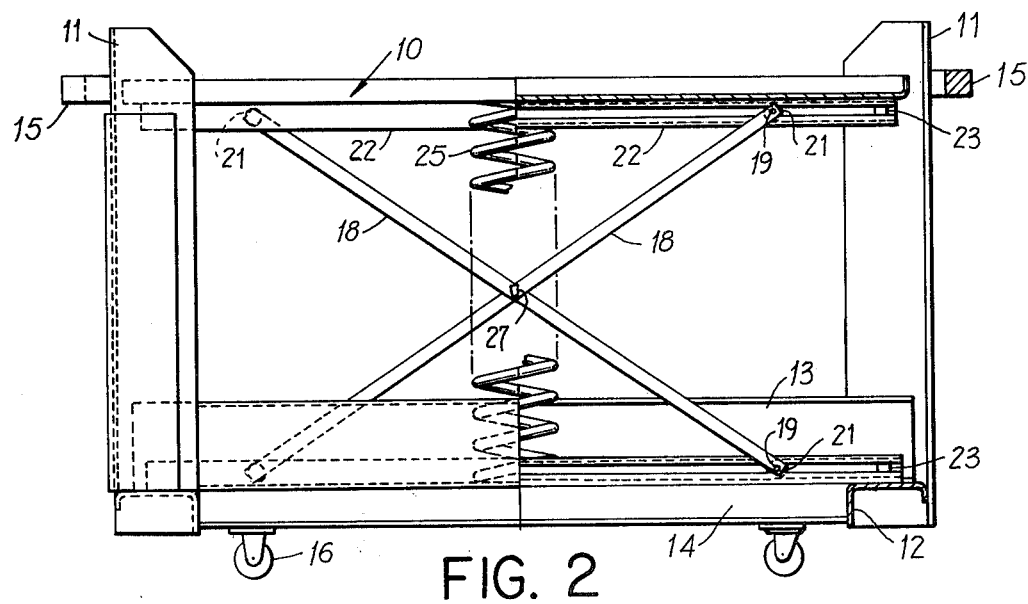
Figure 3:
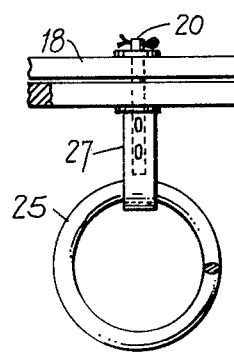
Figure 4:
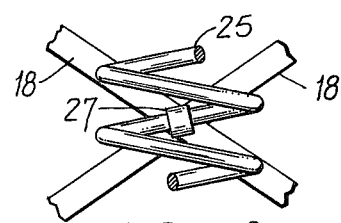
Figure 5:
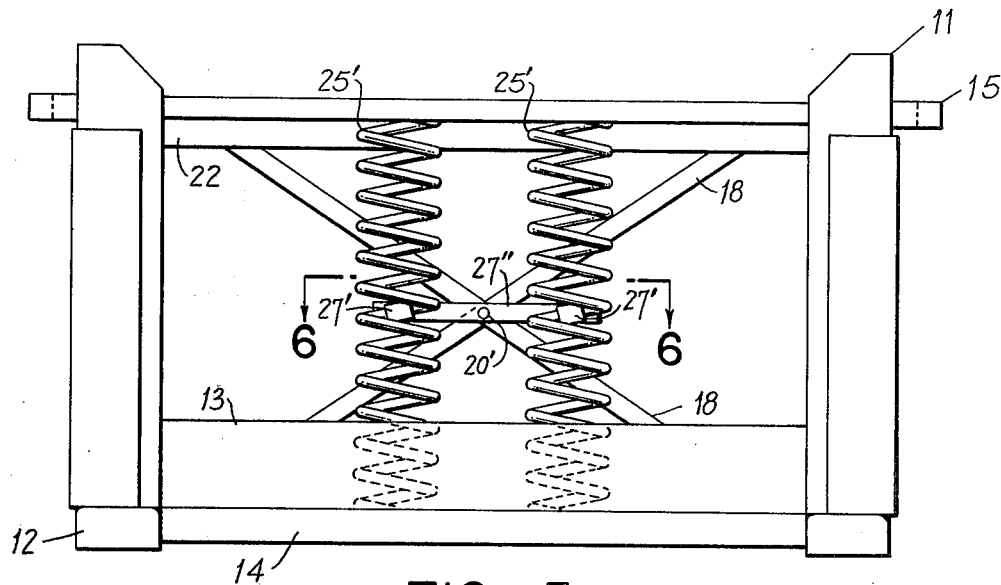
Figure 6:
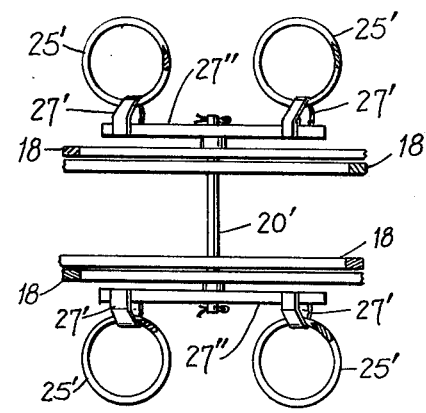

Referring to the two sheets of drawings attached hereto; FIG. 1 is a broken away top plan view of one form of the invention, FIG. 2 is a side view, and FIGS. 3 and 4 are enlarged top plan and side views respectively of the main compression spring to scissors axis connection; and, FIG. 5 is a side view comparable to FIG. 2 showing a modification in the compression spring to scissors axis connection, and FIG. 6 is a sectional view taken along the section line 6—6 of FIG. 5.

Referring now to the first sheet of drawing (FIGS. 1-4), the device comprises a materials dispensing table or platform 10. Table 10 is positioned within the four corners of four upright right angle irons 11. Irons 11 are connected at their bottoms to a base frame comprising end channels 12, side channels 13, and bottom channels 14. Handles 15 can be provided at the ends of the unit, and it can be made movable by mounting the base on castors 16. The parts 11–14 are rigidly interconnected by welding the same together. The part 14 has side flanges 14' for connecting a tension spring anchor bar 17 thereto for a purpose to be described shortly.

Positioned between the base and table are tandem (a pair) scissors 18. The four ends of the scissors 18 have end shafts 19 welded or otherwise affixed thereto so that the spacial arrangement of one scissors is fixed with respect to the other. At their centers the scissors are connected together by scissor axis pins 20, see especially FIG. 3. Each of the outer ends of all the shafts 19 protrude slightly laterally beyond the scissor arms 18 and have rollers 21 mounted thereon. These rollers ride in top and bottom pairs of guides 22. The guides are closed C-shaped in cross-section so that once the scissor rollers 21 are mounted therein the tandems scissors are fixed in a side-to-side sense, but are free to slide or "float" in the end-to-end sense.

The bottom pair of guides 22 are affixed to the base, and the top pair to the underside of the table 10. In assembly the scissors are placed in position by sliding their rollered ends into the guides 22. Extreme endwise movement of the scissors in the guides 22 is limited by stops 23 positioned at the ends thereof.

It will be seen that if unrestrained the scissors are free to slide back and forth in either endwise direction towards the angle irons 11 or handles 15. However, for the unit, and the forces imposed thereon to be balanced or equalized, the scissors should be centered. This is accomplished by the tension spring 19', see FIG. 1, (one at each end, although only right-hand end one shown). The spring 19' extends between bar 17 and its corresponding bottom scissors shaft 19'. Although only a single spring 19 is shown, the bar is apertured (holes 24) so that a plurality of tension springs can be used, if needed.

The main compression springs 25, one on each side of the unit, are calibrated to give a uniform rate of travel (that is; distance of expansion or depression per unit weight removed or added to the table), as is well-known to those skilled in the art. The compression springs 25 are positioned between the scissors and side channels 13; that is, on the base channels 14 contiguous to the outer ends of the scissors axis 20. As is also well-known to those skilled in the art, cups or the equivalent of a pair of U-shaped cross pieces 26, affixed to the central portion of the base members 14, centers the bottom ends of the compression springs 25, and the same can be done to the upper ends of the compression springs 25 which bottom on the underside of the table 10.

Suitable clips 27 or the like tie the scissors axis 20 to the lengthwise center of the compression springs 25, see also FIG. 3. Thus, in the illustrated position of the unit, everything is centered. The axis 20 of the scissors and the lengthwise center of compression springs 25 merely rises or falls as weight is removed or added to the table respectively. Should the scissors axis move to left or right (endwise direction of the unit) one of the tension springs 19 will be tensioned more than the other, and this will cause the mechanism to be shifted back to the illustrated centered position. Shifting of the mechanism to left or right will sometimes occur by one or more of the compression springs 25 buckling as the unit is loaded. Of course, when this happens, the tension springs 19 will correct this by causing the mechanism to move back to centered position, and as the mechanism moves back to centered position, it pulls the buckled compression spring 19 back to straight up and down position at the center of the unit. If it should occur that the compression springs 25 have a particular tendency to buckle towards one side, then of course more or stiffer tension springs can be used on the other side of the unit to counteract this tendency. Thus, besides the device being automatically self-centering, it is possible to expeditiously make further adjustments therein at the springs 19'. Referring now to the second sheet of drawing (FIGS. 5, 6), this form of the invention is the same as heretofore described except that the tandem scissors 18 are tied together by a through shaft 20' instead of separate pins 20; and pairs of compression springs 25' are used instead of single compression springs 25; and the springs 25' are connected to the scissors axis by clips 27' on the ends of spacer and equalizer or balance bars 27" pivoted on the scissors axis, instead of just the clips 27. Thus, the invention is applicable to the use of one or more, and indeed a bank of compression springs on each side of the unit, and the arrangement of FIGS. 5, 6 (noting especially the pivoted bars 27") provides additional means to prevent the compression springs from buckling or acting in a manner which is otherwise than a uniform lengthwise direction.

We claim:

1. In a materials dispenser, a base, a table, a scissors centrally positioned between the two, each of opposite pairs of ends of the scissors being slide connected to the base and frame respectively so that the scissors is free to slide in either of its lengthwise directions, a main compression spring centrally positioned between the base and frame, the central portion of said spring being connected to the axis of said scissors to be constrained to move in unison therewith, and tension spring means connected to said scissors and at least one of said base and frame to constrain said scissors axis to central position with respect to said base and frame.

2. In a materials dispenser, a generally rectangular shaped base, upright right angle corner irons at each corner of said base, a movable table positioned above said base and positioned within said corner irons, a scissors positioned one at each of two opposite sides of said dispenser, the axes of said pair of scissors being aligned with each other and the center of said base and table, four shafts interconnecting the corresponding ends of said pair of scissors, rollers at each and every end of said four shafts, a pair of spaced generally close C-shaped roller guides on said base and the underside of said table, said rollers being positioned in said guides, end stops for said rollers at each end of said guides, at least one main compression spring at each of said dispenser sides contiguous to said scissors axes, said main compression springs extending in a lengthwise direction between said base and table and having their lengthwise central portions connected to said scissors axes, and tension springs positioned in the general plane of said base and between said compression springs and the bottom ones of said scissors shafts and connected to said base and last-mentioned ones of said shafts to constrain said scissors axes into said alignment with said center of said base and table.

3. In a dispenser as in claim 2, wherein a single main compression spring is positioned at each side of said dispenser, and each of said single main compression springs being positioned immediately contiguous to its corresponding scissors axis and being directly connected thereto at its lengthwise central portion.

4. In a dispenser as in claim 2, wherein a pair of main compression springs are positioned at each side of said dispenser, a pivot arm connected at each of its ends to the central portion of each pair of main compression springs, a shaft extending through the axes of said pair of scissors, and the opposite ends of said last-mentioned shaft having the central position of said pivot arms connected thereto.

* * * * *